United States Patent [19]

Gatta

[11] Patent Number: 4,939,838

[45] Date of Patent: Jul. 10, 1990

[54] COMPLIANT POSITIONING SYSTEM FOR OPERATING ON ASSEMBLY LINE PRODUCTS

[76] Inventor: Raymond P. Gatta, 249 Ironwood Cir., Aurora, Ohio 44202

[21] Appl. No.: 332,473

[22] Filed: Apr. 3, 1989

[51] Int. Cl.⁵ .............................................. B23P 19/00
[52] U.S. Cl. ...................................... 29/795; 29/822; 29/823; 29/824
[58] Field of Search ................ 29/791, 795, 822, 823, 29/824, 33, 563; 198/345; 901/1, 6, 7, 8

[56] References Cited

U.S. PATENT DOCUMENTS

| | | | |
|---|---|---|---|
| 1,881,519 | 10/1932 | Groehn et al. | 29/824 X |
| 4,589,184 | 5/1986 | Asano et al. | 29/791 X |
| 4,589,199 | 5/1986 | Ohtaki et al. | 29/33 P X |
| 4,616,411 | 10/1986 | Suzuki et al. | 29/822 |
| 4,670,961 | 6/1987 | Fontaine et al. | 29/563 X |
| 4,674,181 | 6/1987 | Hamada et al. | 29/791 X |
| 4,757,608 | 7/1988 | Ochi | 29/824 X |
| 4,789,417 | 12/1988 | Komatsu et al. | 29/791 X |
| 4,841,632 | 6/1989 | Namiki et al. | 29/823 X |

FOREIGN PATENT DOCUMENTS 6879  1/1987  Japan ....................................... 29/791

Primary Examiner—Mark Rosenbaum
Assistant Examiner—Frances Chin
Attorney, Agent, or Firm—Watts, Hoffmann, Fisher & Heinke

[57] ABSTRACT

A positioning system for installing body side moldings on cars or trucks is disclosed. The system automatically positions first and second spaced apart portions of a side molding platen in precise positions with respect to widely spaced locations on assembly line cars or trucks where successive vehicles have slightly differing pitch, yaw and roll orientations with respect to the positioning system. The positioning system comprises: A support unit; first and second positioners supported by the unit for engagement with respective first and second product locations to position the first and second platen portions with respect to the first and second product locations; the positioners have first and second product locator structures for respectively engaging and locating the first and second product locations with respect to the first and second positioners; first and second platen actuators carried by the first and second positioners move the platen portions into operating positions precisely positioned with respect to the product locations; and, connecting structure secures the first and second actuators to the first and second platen portions for limited relative motion to enable the positioning system to accommodate pitch, roll and yaw variations in the vehicle orientation.

16 Claims, 9 Drawing Sheets

COMPLIANT POSITIONING SYSTEM FOR OPERATING ON ASSEMBLY LINE PRODUCTS

FIELD OF THE INVENTION

The present invention relates to a system used for conducting manufacturing operations on assembly line products and more particularly relates to a system for automatically accomplishing operations normally accomplished by assembly line workers on large scale products which are not precisely positioned, one to another, in the assembly line.

BACKGROUND OF THE INVENTION

Assembly lines for production of large scale products, such as cars and trucks, are typically designed so that assembly line workers can perform various tasks on successive products which are spaced apart on the line. The products move past the workers or the workers move past the product (e.g. as in aircraft assembly lines). When workers perform operations on the products, the workers accommodate to differing positions or orientations of successive products with respect to the line without difficulty. The fact that successive products may be a fraction of an inch higher or lower than one another, for example, may not even be noticed by workers performing tasks such as attaching body side moldings or drilling holes.

In the case of continuously moving assembly lines on which cars and trucks are fabricated, work stations have often been equipped with tools and fixtures which can be handled by workers who move along with the line for a short distance while completing their tasks. Oftentimes tools and fixtures have been suspended from overhead structures by cables. The overhead structures have been constructed so that the suspended elements are not only counter-weighted (or supported in an equivalent manner by springs) but also movable along the line with the passing product. These devices are sometimes referred to as "ergonomic" because they are designed to reduce worker effort and fatigue.

Counter-weighing these elements materially reduces the amount of physical effort required by the worker to position and use tools or fixtures but does not eliminate exertion because the elements must usually be hefted to operating positions by quick motions not fully compensable by counter-weights or spring take-up devices. Furthermore certain tasks can not be performed by a single worker regardless whether ergonomic equipment is used. For example, in the case of applying body side moldings to relatively large cars and trucks it is usual to place all segments of the side moldings on one long holder, or platen, which must be accurately aligned with the vehicle body side preparatory to applying the side moldings.

In a typical prior art assembly line for cars and trucks the body side moldings have been applied by workers on each side of the assembly line. The side molding segments, which are usually formed by a rubber or plastic strip of decorative material carrying an adhesive on the back, are loaded onto an elongated platen which is then attached to an applicator machine. Alignment of the molding platen sometimes requires two workers, both of whom position the platen by each aligning one end with a respective predetermined location on the body. The molding segments are then applied simultaneously so that the molding strips on the doors and adjacent body sections are aligned with each other and with the body.

The applicator machine is suspended from overhead structures which provide for movement of the machine vertically and horizontally for alignment with the body as well as horizontally with the body as it moves along the line while the moldings are being applied. The machine has an elongated support body carrying body locators and platen actuators. The platen actuators include pneumatic rams having actuator arms to which end portions of the molding platen are detachably secured.

Each worker grasps one end of the applicator machine and hefts the end to a position where the body locator at that end of the machine engages a predetermined part of the body, usually a wheel well. This is done as the body continues to move along the assembly line. Once properly aligned, the machine is held in place by the workers while the platen actuators are operated to force the body molding segments on the platen into firm engagement with the body. The molding segments are consequently adhered to the body in precise locations relative to the body.

This done, the machine is removed from the body and returned to its original station along the line. In some machines the platen is removed and positioned for receiving the molding segments for the next car or truck. The procedure is then repeated to apply the side molding segments to the next body as it proceeds along the line.

Four workers are often required by this procedure for attaching body side moldings, not to mention the capital requirements for purchasing the applicator machinery. Despite the drawbacks this procedure has been the best available technique because the body side moldings have to be accurately placed on the bodies, to relatively tight tolerances, and the cars and trucks moving along the line have differing pitch, roll and yaw orientations with respect to the applicator machines as well as complex surface curvatures.

The permissible variation in body orientation from body to body is substantially greater than the within tolerance variations of the side molding placements. Out of tolerance side molding placements are readily seen by observers of the finished product because these elements have to align with doors, wheel wells, etc. Misaligned parts are often visually obvious even though the degree of misalignment may be relatively slight.

The application of body side moldings (and the performance of equivalent or similar tasks on assembly line products) has not only been excessively labor intensive, and for that reason alone undesirable, but also undesirable to perform because of physical demands. These operations would thus seem to be natural candidates for the introduction of "robots" similar to those used for welding operations and the like on modern vehicle assembly lines. Unfortunately, the usual robot installation involves equipment requiring highly precise placement of the vehicle bodies.

Put another way, the typical robot is not "compliant" in the sense that it is not tolerant to varying product locations on an assembly line. Thus the products typically have to be accurately located with respect to the robot in order for the robot to accomplish its task. While this can be accomplished technically, an installation required to assure proper body alignment may be so expensive that it could not be justified for many applications, such as the installation of body side moldings.

DISCLOSURE OF THE INVENTION

The present invention provides a new and improved positioning system for automatically positioning a work or tool holding platen in a precise position with respect to widely spaced locations on assembly line products wherein successive products have differing pitch, yaw and roll orientations with respect to the positioning system. The new system is so constructed and arranged that it is compliant with the varying product orientations without requiring the intervention of assembly line workers to locate and position the platen relative to the product. The platen may be a work supporting fixture or a tool holder for enabling manufacturing operations to be performed on the product.

In a preferred and illustrated embodiment of the invention the new system comprises a support unit; first and second platen positioners supported by the unit and biased toward engagement with first and second product locations to position respective first and second platen portions with respect to the product locations, the positioners each comprising product locator structure for engaging and locating the product locations with respect to the positioners and, platen actuators for moving the platen portions into operating positions precisely positioned with respect to the respective product locations; and, connecting structure for securing the first and second platen actuators to the first and second platen portions for limited relative motion to enable the positioning system to accommodate pitch, roll and yaw variations in product orientation.

An important feature of the invention resides in the construction of a support unit comprising a support base and a carriage for the positioners which is movable relative to the base to enable the positioners to shift relative to the base while engaging the product locations.

Another feature of the invention resides in the construction of the platen positioners wherein each product locator structure includes a product engaging element supported for movement with respect to the product by a locator actuator and wherein when both elements engage the product one locator actuator drives its associated element to a predetermined engagement position relative to the carriage against the force of the other element actuator to precisely adjust the support unit position relative to the product.

Still another feature of the invention resides in the interrelationship between the platen actuators, the respective positioners and the platen whereby the platen is supported by platen actuators for movement toward its operating position and the connecting structure provides for limited relative rotational and translational motion between each platen actuator and the platen so that the platen actuators are free to travel independently from each other to a limited extent as the platen is positioned relative to the product for performing an operation on it.

Another feature of the invention resides in the construction of at least one platen positioner in the form of a body member slidably supported on the carriage and wherein the product locator structure comprises a product engaging element supported for movement with respect to the body member so the element shifts to and away from a product engaging position.

The new system is particularly suited for use with a continuously moving assembly line where products, such as cars and trucks, are moved along a path relative to the system. The system operates to perform a manufacturing operation on the passing products, such as applying body side moldings. Features of the new system enable the application of body side moldings, for example, by a single worker per body side in a manner which permits the worker to perform the task with little physical exertion and virtually no involvement with actually performing the operation beyond loading side molding segments on platens.

The support unit comprises a base forming a trackway supporting the carriage and constraining motion of the carriage to a predetermined path parallel to the assembly line path of travel. The carriage supports the positioners which are independently actuatable toward and away from engagement with a product on the line. Each positioner is movable along a path fixed with respect to the carriage. The positioner actuators operate with limited force so that the positioners can be effectively biased into engagement with the product for locating purposes while the positioners move along the trackway in pace with the product.

The platen is connected to platen actuator arms each rotated about an axis remote from the connection to the platen. The platen is moved from a platen loading position, readily accessible to assembly line workers, to a position for operating on the product. As the platen is moved to its operating position the platen actuator arms each shift about the arm axis which is parallel to the extent of the platen. Each arm axis is fixed with respect to the associated positioner at a location where the axis is located in or quite close to the plane of the product surface upon which the manufacturing operation is to be performed. Should the product be misaligned such that the platen actuator arms travel different distances about their respective axes the differential travel has virtually no effect on the vertical alignment of the opposite platen ends with the product when the platen is in its operating position.

Further features and advantages of the invention will become apparent from the following detailed description of a preferred embodiment made with reference to the accompanying drawings which form part of the specification.

DISCLOSURE OF THE BEST MODE FOR PRACTICING THE INVENTION

Figure 1:
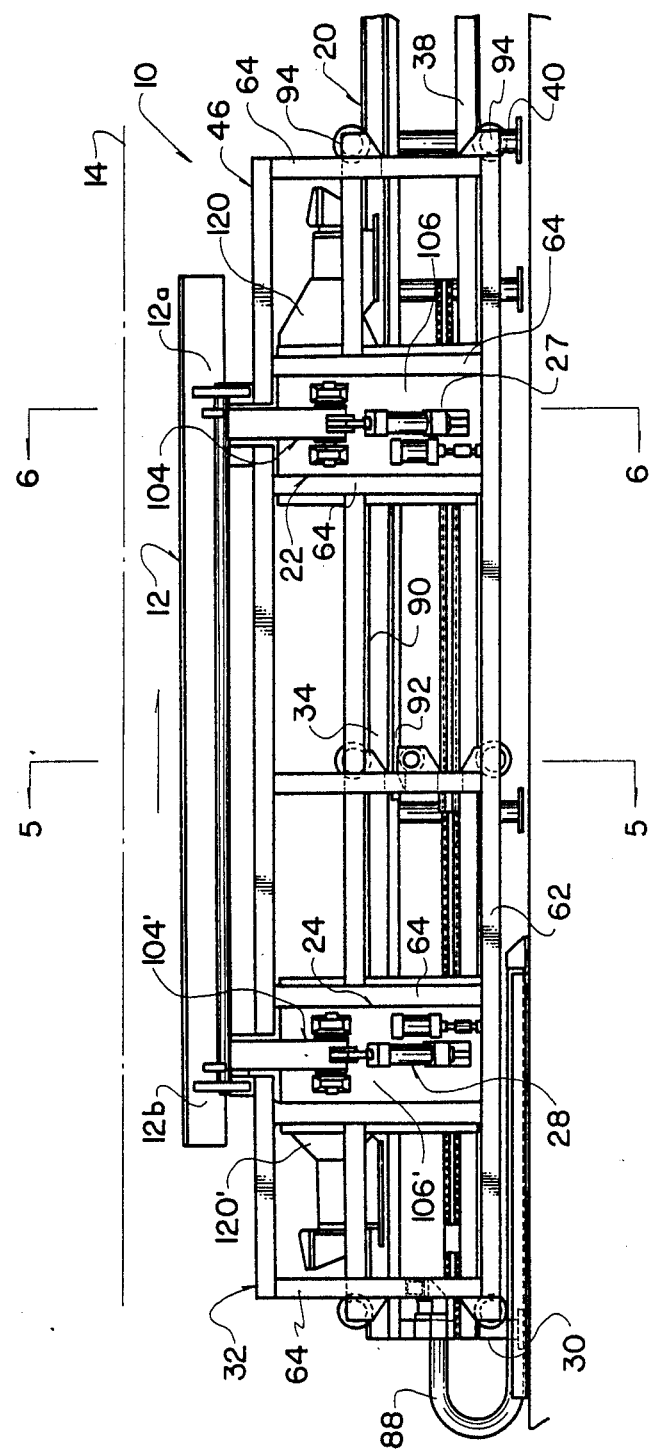
FIG. 1 is an side elevational view of a vehicle body side molding application system constructed according to the present invention.

A new and improved positioning system 10 for automatically performing a manufacturing operation precisely positioned with respect to widely spaced locations on assembly line products having differing pitch, yaw and roll orientations is illustrated by the drawings. The new system 10 includes a work or tool holding platen 12 which is positioned for performing accurately located manufacturing operations on the products yet is so constructed and arranged that it complies with the varying product orientations and irregular shapes without losing accuracy and without requiring any assembly line workers to locate and position the platen 12 relative to the product.

The system 10 is illustrated as installed in a car and truck manufacturing plant having a continuously moving production line for moving partially assembled vehicle bodies B along a path of travel 14 extending past the system 10. The assembly line is of standard construction, forms no part of the invention and is not described or illustrated in detail. Suffice to sayd that the line is constructed in the form of a conveyor having parallel, continuously driven conveyor chains upon which vehicle body supports, in the form of I beams, are carried. The conveyor chains are shrouded by a support housing elevated slightly above the floor of the factory building. The vehicle bodies B are deposited atop the I beams and moved continuously along the path 14 when the line is operating.

In the preferred embodiment the system 10 applies body side moldings to each side of each body B as it proceeds along the path 14. Side moldings are typically applied to the vehicle doors and adjacent body side surfaces and must not only be accurately aligned with each other but also accurately positioned with respect to the door frames, wheel housings and body rocker panels. The side moldings are formed by resiliently flexible elongated rubber-like decorative strips having an adhesive material on their backs which bonds the strip to the body when the strip is pressed onto the body. Side moldings are loaded on the platen 12 and when the vehicle body is appropriately positioned in front of the system 10 the platen is actuated to press the adhesive side of the side molding strips against the body B.

The bodies B are not located on the assembly line conveyor with extreme precision and thus it happens that successive vehicle bodies moving along the path of travel 14 have varying roll, pitch and yaw orientations from body to body. The variations in the body orientations referred to may in fact be significantly greater (e.g. 20 mm) than the tolerance band governing the placement of body side moldings (as little as 1 mm). Thus it is necessary to accurately locate where the body B is as a prerequisite to positioning the side moldings for application.

As noted, the preferred and illustrated system 10 applies side moldings to both sides of vehicle bodies on the assembly line. The system 10 thus includes independently operating installations on opposite sides of the path of travel 14. Since these installations are essentially mirror images of each other, and therefore for practical purposes are identical, the system 10 is illustrated and described so far as it relates to one side of the assembly line.

The system 10 comprises a support unit 20; first and second platen positioners 22, 24 supported by the unit 20 for engagement with a body B and supporting the platen 12 and side moldings placed on it; platen actuator assemblies 27, 28 respectively forming part of each positioner 22, 24, for actuating the platen 12 to press the side moldings against the body B; and, connecting structure 29 for securing the platen actuator assemblies 27, 28 to first and second spaced apart platen portions 12a, 12b to enable limited relative motion so that the positioning system 10 accommodates pitch, roll and yaw variations of successive bodies B.

THE SUPPORT UNIT

The support unit 20 is constructed for supporting the positioners to engage the body B and accurately position the platen 12 relative to the body during application of the side moldings. The illustrated unit 20 includes a base 30 anchored to the factory floor, a carriage 32 supporting the positioners 22, 24 and a trackway 34 for enabling the carriage 32 to move back and forth parallel to the assembly line path 14 relative to the base 30. In the preferred embodiment of the invention the positioners 22, 24 engage a body B moving along the path 14 to align the platen 12 for applying the side moldings. While the body is so engaged it propels the carriage 32 along the trackway 34 relative to the base during the time the platen and body are being aligned and as side moldings are applied. After the side moldings are applied the carriage is disengaged from the body B and returns to its original position.

Figure 2:
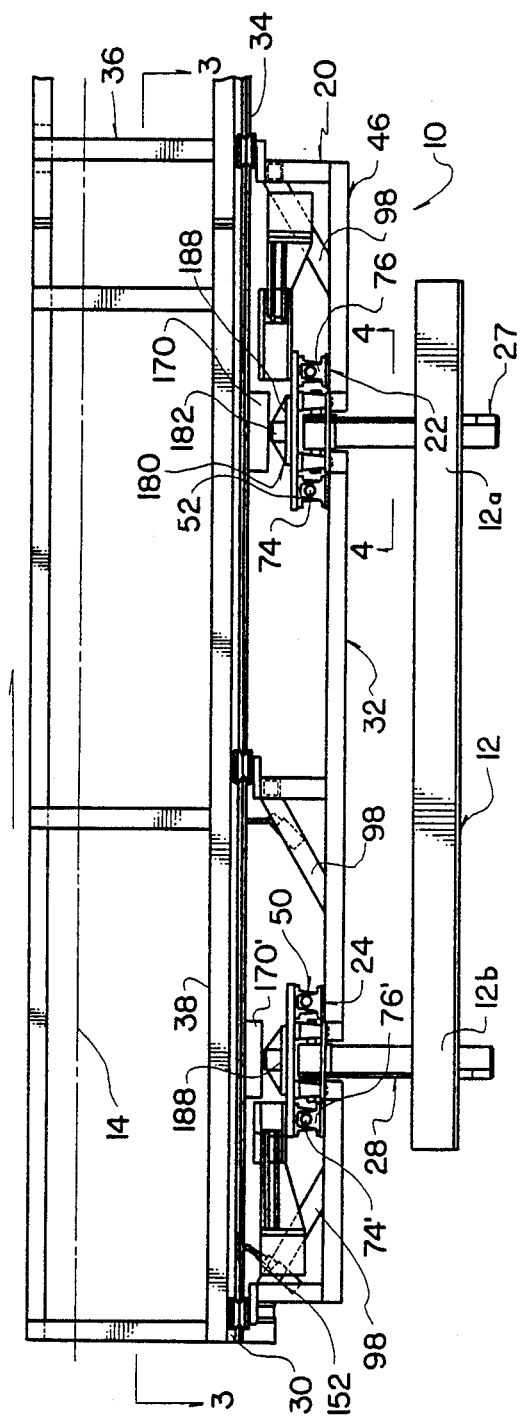
FIG. 2 is a top plan view of the system of FIG. 1.

The base 30 is formed by a structural steel framework including a rectangular generally horizontally oriented base frame 36 (FIG. 2) anchoring the base to the floor and an upright frame 38 (FIGS. 1, 2 and 5) extending upwardly from the base frame 36 and along the side of the path of travel 14. The base frame 36 is disposed in part beneath the assembly line chain conveyor and is attached to the factory floor by anchor bolts, or the like, which are secured to frame support legs 40 (FIG. 1). The base frame 36 and the upright frame 38 are constructed by welding tubular steel frame members together and the base and upright frames are likewise welded together so that the resultant structure is extremely stable and stiffly supports the carriage 32, associated positioners, etc., relative to the path 14.

The carriage 32 (see FIGS. 1, 3 and 5) is supported for movement relative to the base 30 parallel to the path 14 and carries the positioners and the attached platen 12. The illustrated carriage comprises a carriage body 46 formed by a structural framework, positioner guide assemblies 50, 52 connected to the carriage for directing movement of the positioners relative to the carriage, and a carriage drive unit 54 (FIG. 5) for traversing the carriage relative to the base 30.

The carriage body 46 is formed by a generally rectangular structural framework which confronts the upright frame 38 and comprises horizontally extending vertically spaced beam elements 60, 62 connected by vertical stringers 64 welded in place between the beam elements. The upper beam element 60 includes bridgelike structures at the positioner locations to provide clearance for the platen actuators 27, 28 when the platen is actuated to press the side moldings onto the body B. The bridge-like structures are each formed by short tubes 66 projecting upwardly from the beam 60 on opposite sides of the positioner locations and a bridging bar 67 welded in place between the upper ends of the tubes 66 (see FIGS. 2, 5 and 6).

The guide assemblies 50, 52 connect the positioners 22, 24 to the carriage 32 and constrain them for movement relative to the carriage along travel paths, indicated generally by the reference characters 70, 72, (FIG. 3) which are fixed with respect to each other.

The guide assemblies are identical and therefore only the assembly 50 is described in detail. Parts of the guide assembly 52 corresponding to described parts of the assembly 50 are designated by identical primed reference characters in the drawing.

The guide assembly 50 comprises cylindrical guide rods 74 secured to the carriage frame members 60, 62 by anchor blocks 76 fastened to the respective frame members. The rods 74 are parallel and extend along the carriage body 46 generally vertically. The rods 74 have smooth surfaces which slidably support the positioners to enable the positioners to move generally vertically along their respective travel paths 70, 72 toward and away from the body B relative to the carriage.

Figure 5:
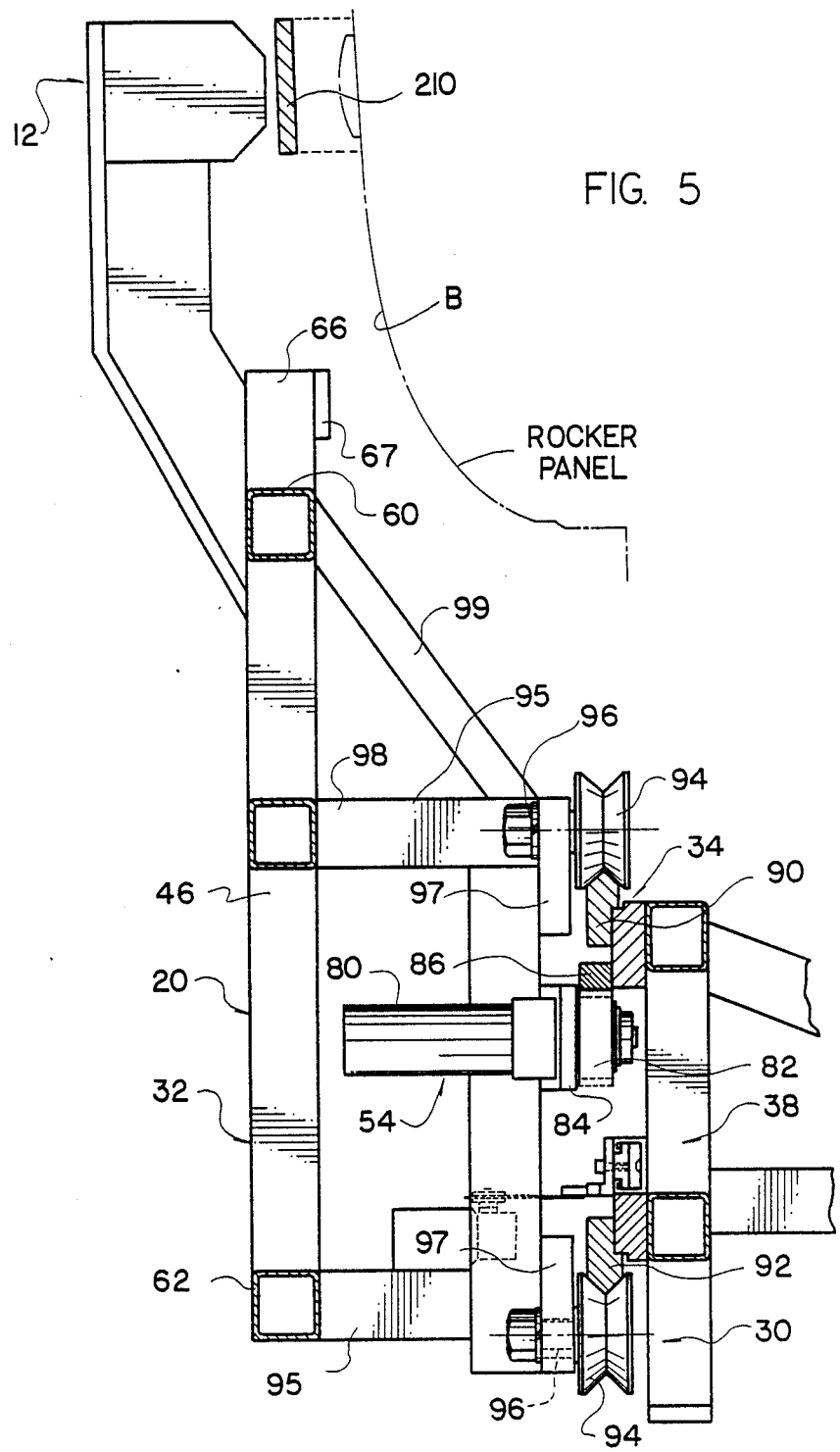
FIG. 5 is a fragmentary cross-sectional view seen approximately from the plane indicated by the line 5—5 of FIG. 1 and shown on a scale which is larger than the scale of FIG. 1.

The carriage drive unit 54 drives the carriage along the trackway 34 and functions to return the carriage 32 to its starting position, referred to here as the "home" position, after side moldings have been applied to a body B and the positioners have disengaged it. The preferred drive unit 54 comprises an air driven rotary motor 80 fixed on the carriage for driving a pinion gear 82 via an overrunning clutch 84 (FIG. 5). The pinion gear runs in mesh with a rack 86 fixed to the upright base frame 38 so that when the motor 80 is operated in its traverse direction the pinion gear drives the rack 86 to traverse the carriage 32 along the base 30 toward the home position. When the body B engages the positioners and moves the carriage along the base 30 in the opposite direction, the motor 80 is driven in reverse. Consequently the clutch 84 overruns, thus disengaging, so the pinion gear 82 is free wheeled by the rack as the body B moves the carriage.

The air motor 80 and various other actuators carried by the carriage 32 are all operated from a pneumatic source in the factory and the control of these devices is primarily accomplished electrically from a house power supply. The pneumatic and electric power supplied to the carriage mounted devices is fed via a flexible conduit 88 (FIG. 1).

The trackway 34 coacts between the carriage and the base to facilitate carriage movement to and from its home position. In the illustrated system 10 the trackway comprises vertically spaced tracks 90, 92 (FIGS. 1 and 5) fixed on the base frame 38 and cooperating track wheels 94, having peripheries grooved to conform to the tracks, connected to the carriage.

Three pairs of track wheels 94 are supported on the carriage with the wheels of each pair spaced vertically apart. Each wheel is disposed at the end of a support arm 95 (FIG. 5) attached to and projecting from the carriage body 46 toward a respective track. Each wheel 94 is rotatably supported on an associated axle 96 which is fixed to the arm 95 by a support block 97. The projecting ends of the arms 95 associated with each pair of wheels are connected by vertical stringers and further braced by angled gusset tubes 98 (FIG. 2) welded in place between the carriage body and respective arms. An upwardly angled vertical stiffener tube 99 (FIG. 5) is welded in place between each uppermost arm 95 and the carriage body 46 to brace the wheels.

The tracks 90, 92 are straight and horizontal so that the carriage elevation remains constant relative to the body B as the carriage moves along the base. The upper track 90 is preferably mounted alongside and parallel to the rack 86.

The Positioners

The positioners 22, 24 are spaced apart on the carriage 32 in the direction of the body travel path 14 and operate to locate widely spaced features of the body B and use those features to accurately apply the side moldings. The positioners are independently movable vertically along their respective travel paths 70, 72 into body locating positions but are constrained against relative horizontal movement. In the preferred embodiment of the invention the positioners 22, 24 include respective body locators, generally indicated by the reference characters 100, 100', formed by mechanisms for locating the body B vertically and horizontally with respect to the carriage.

The positioners 22, 24 are, for the most part, mirror images of each other, and, for purposes of structural description, sufficiently identical that only the construction of the positioner 22 is described in detail. Corresponding parts of the positioner 24 are designated in the drawings by identical reference characters which are primed and where structural differences are related to functional distinctions the differing structural aspects are noted.

The positioner 22 comprises a positioner body assembly 104 which, when a vehicle body B is present on the path 14 at the location of the system 10, is biased toward with the body B. The locator 100 is mounted on the body assembly 104 for engaging the vehicle body and locating the vehicle body B with precision horizontally and vertically with respect to the body assembly 104. The platen actuator assembly 27 is supported by the assembly 104 for shifting the platen portion 12a between a side molding loading position remote from the path of travel 14 and a side molding application position where the molding is placed on the body B.

Figure 4:
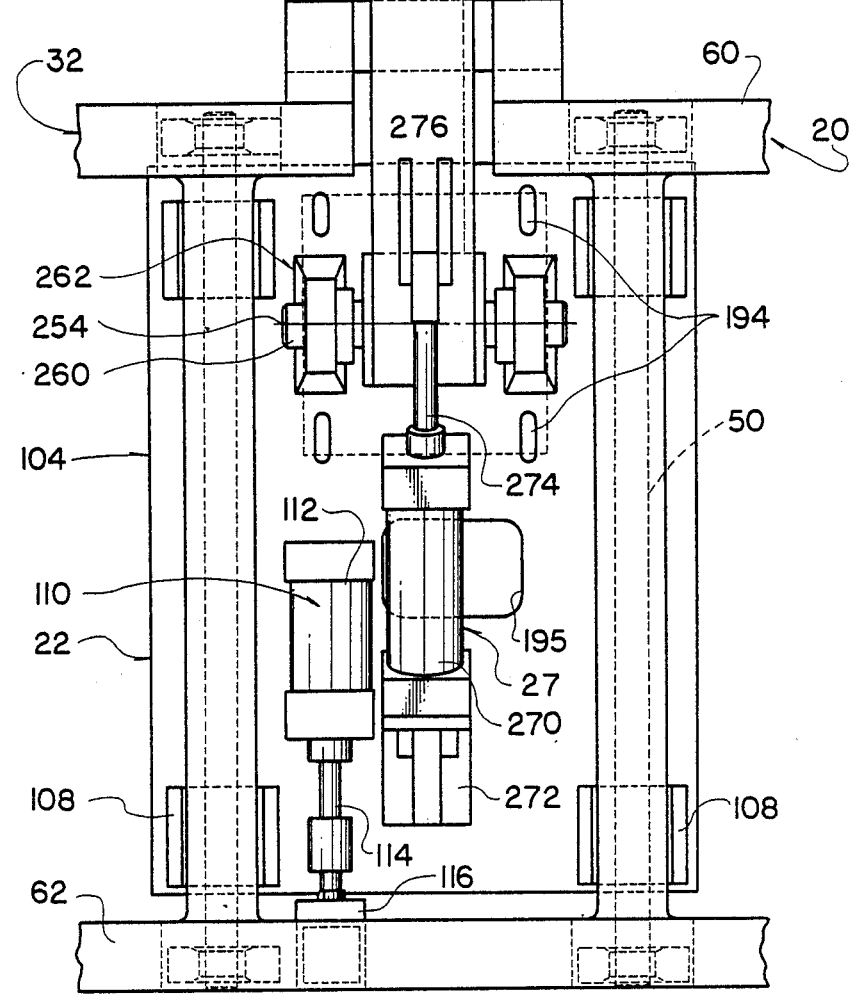
FIG. 4 is a fragmentary elevational view seen approximately from the plane indicated by the line 4—4 of FIG. 2 and shown on a scale which is larger than the scale of FIG. 2.

The illustrated positioner body assembly 104 is disposed for reciprocation in a generally vertical direction along the guide rods 74. The preferred assembly 104 comprises a rigid plate-like body member 106 disposed in a generally vertical plane, bushing mounting assemblies 108 (FIG. 4) fixed on the major surface of the body 106 facing away from the path of travel 14 for receiving the guide rods 74, and a positioner actuator 110 for shifting the body member 106.

The positioner actuator 110 (see FIG. 4) is effective to move the positioner assembly toward and away from a vehicle body B and to bias the locator 100 into engagement with the body B. The actuator 110 is of the pneumatically operated ram and cylinder type having its cylinder 112 fixed on the body member 106 adjacent the lower side of the member 106 and its ram 114 extending from the cylinder to a support anchor 116 fixed on the carriage beam 62.

When a vehicle body B is moving past the location of the system 10 and just begins to move the carriage 32 from its home position the actuator 110 is operated to shift the positioner body member 106 upwardly. The actuator 110 biases the locator 100 into engagement with the body B during the side molding application procedure and, at the conclusion of the procedure, the actuator 110 lowers the body member to its initial position.

The actuator 110 is connected to the air pressure source via a conventional adjustable, pressure regulator (not shown) which is adjusted to limit the operating pressure supplied to the actuator to a level below the supply level. Thus the actuator 110 maintains the locator 100 firmly engaged with the body B yet does not exert sufficient biasing force to lift or otherwise contribute to shifting the body B on the conveyor chains. The actuator operation is governed by conventional control valving (not illustrated) which is pneumatically and electrically operated.

The body locators 100 serve to align vehicle bodies B both vertically and horizontally relative to the carriage 32 for enabling side moldings to be applied with precision. The locator 100 of the positioner 22 cooperates with the locator 100' of the positioner 24 to force relative motion, in a horizontal direction, between the carriage and the vehicle body for accurately aligning each vehicle body B with the carriage 32. The locator 100 comprises a horizontal vehicle body locator unit 120 and a vertical locator unit 122 which coact to position a body B in a predetermined position in front of the positioner 22.

Figure 7:
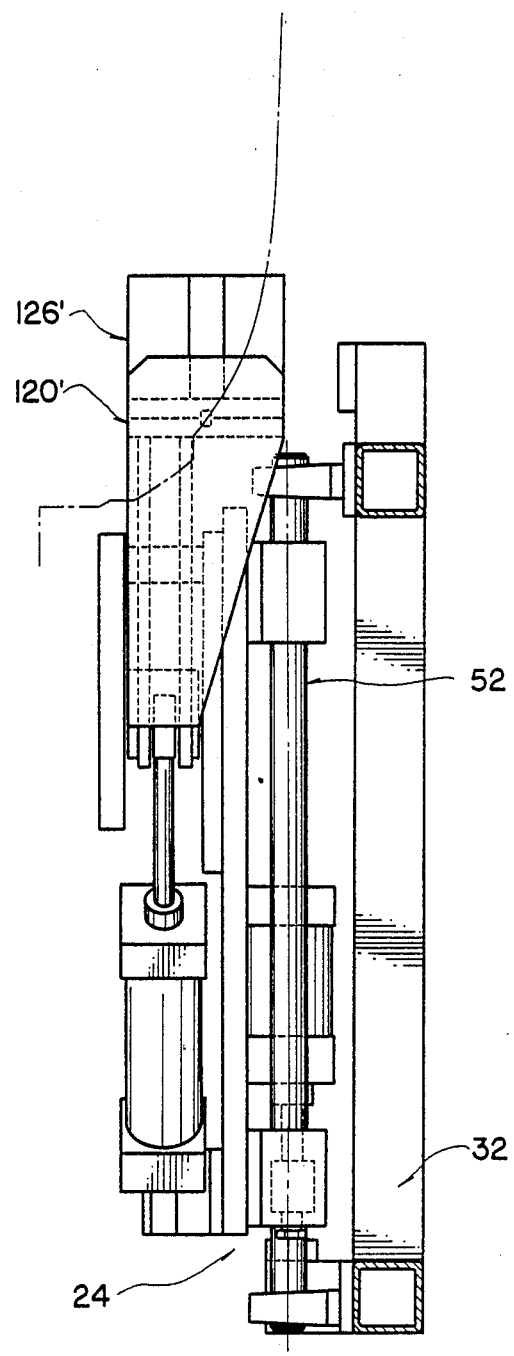
FIG. 7 is a fragmentary cross-sectional view seen approximately from the plane indicated by the line 7—7 of FIG. 3 and shown on a scale which is larger than the scale of FIG. 3.

The horizontal locator unit 120 (see FIGS. 3 and 7) comprises a vehicle body engaging bumper member 126, a linkage 130 supporting the bumper 126 for movement relative to the positioner body 106 between a vehicle body engaging position (see FIG. 3) and a retracted position (FIG. 1), and a locator actuator 132 for articulating the linkage 130.

The preferred an illustrated system 10 is constructed so that the bumper member 126 is moved into position to engage the body along the rear edge of the leading wheel well as the body arrives at the system location. The bumper member 126 comprises a hard rubber, or plastic, pad 134 and a support weldment 136 having a backing flange to which the pad is bonded. The pad is rigidly supported by the weldment 136 which is screwed onto the linkage 130. The pad material, while hard, is sufficiently smooth that it can slide slightly (without damaging the body B) on the wheel well edge as the body B and the carriage are aligning.

The linkage 130 comprises a clevice 140 welded to the body member 106, a pivot arm 142 extending between the clevice 140 and the bumper member 126, and a trunnion 144 rotatably connecting the clevice and the pivot arm. The clevice 140 is preferably constructed from parallel aluminum plates each fastened to one side of the plate-like body 106 and projecting from the body 106 to a mount for the trunnion 144.

The pivot arm 142 pivots about the trunnion axis to shift the bumper into and out of position for contacting the body B. The pivot arm is a plate-like weldment having a bumper supporting flange 146 at its projecting end and a trunnion bearing between the clevice plates for receiving the trunnion.

The locator actuator 132 moves the pivot arm 142 and bumper 126 between operational and retracted positions. The actuator is connected between the positioner body 106 and the pivot and is preferably of the pneumatically operated ram and cylinder type. The cylinder is pivotally attached to the body 106 while the ram extends to a pivot joint on the arm 142. The actuator is connected to the high pressure supply source via a pressure dropping adjustable regulator (not illustrated) which is manually adjustable to govern the maximum pressure supplied to the actuator.

In the illustrated system 10 the actuator 132 drives the arm 142 and the bumper to a fixed extended position in the path of the wheel well edge so the location at which the bumper engages the body B relative to the carriage 32 is the same from body to body. The engagement location is defined by a travel stop 148 (FIG. 3) between the arm 142 and the positioner body 106.

The bumper 126 can be adjusted on its supporting flange 146 by a position adjusting screw assembly 150 reacting between the bumper member and the pivot arm. The member 126 is clamped to the arm 142 by screws which are threaded into the support flange 146. The screws extend through elongated slots in the bumper member base so that when the screws are loosened the bumper member can be slid on the flange 146. The adjusting screw assembly is threaded into the arm 142 and extends into engagement with the bumper member. The screw assembly is threaded into or out of the arm threads to slide the bumper member. The position of the bumper thus shifts from place to place along the flange and, when the bumper member is extended or retracted its engagement position with the body B can effectively be adjusted.

The vertical locators 122, 122' accurately position the body B vertically with respect to the carriage 32. When the bumper member 126 has been extended and engages the body wheel well edge, as described, the carriage 32 is moved away from its home position by the body B. This carriage movement operates an electrical sensor switch 152 (FIG. 2), referred to here as the "home" switch, which in turn operates the positioner actuators 110, 110' to shift their respective positioners to the vehicle body engaging positions. The vertical locators 122, 122' thus move to engage the body B and establish the vertical location of the side molding on the vehicle body B. In the illustrated embodiment of the invention the locators 122 engage the body on a downwardly facing section of the body region commonly referred to as the "rocker panel."

The vertical locators are identical so only the locator 122 is described in detail (see FIGS. 2, 3, 4 and 6). The locator 122 comprises a vehicle body engaging member 170 connected to the positioner body 106 by an adjustable support unit 172 which projects from the body 106 toward the path 14 to locate the member 170 just under the body B.

The member 170 is illustrated as a wheel having a rotatable hub 174 and a vehicle body engaging rim 176 fixed about the hub. The rim is preferably formed from hard rubber or plastic material which does not abrade the body B. While the member 170 is illustrated as a wheel it may be constructed differently. For example, the body engaging member can be formed by a shoe-like bumper carrying a rubber or plastic pad which engages the body just as the illustrated wheel does.

The support unit 172 rigidly supports the wheel 170 while enabling it to rotate about the hub axis and also provides for adjusting the position of the axis vertically relative to the positioner body 106. The unit 172 comprises a mounting bracket assembly 180 (see FIG. 6)

connected to the body 106, an axle shaft 182 between the bracket 180 and the wheel 170, and an adjustment mechanism 184 for vertically shifting the position of the bracket assembly on the body 106.

The bracket assembly 180 comprises a support plate 186 disposed along and confronting the body 106 on the side thereof facing the path 14 and a boss 188 projecting out of the plate away from the body 106.

The axle is formed by a stub shaft rotatably supported by a ball bearing assembly forming part of the hub 174 and keyed into the boss 188. The wheel 170 can freely rotate relative to the vehicle body B about the fixed axle shaft. Thus if the vehicle shifts axially relative to the carriage after the locator 122 is engaged with the body B, the wheel is free to rotate while maintaining engagement with the body B and does not slide or skid along the rocker panel. If a fixed bumper with a pad is used in place of the wheel the pad may slide along the rocker panel during adjusting horizontal movement of the body B relative to the carriage; but pad sliding or skidding does not mar the rocker panel finish.

It is not uncommon for vehicle side moldings to be sloped slightly relative to the lower margins of the rocker panels. In some body styles, for example, the side moldings may slope upwardly proceeding toward the rear ends of the vehicles. In other instances slight changes in tooling occur during long production runs resulting in changed vehicle body dimensions and requiring slight adjustments in the side molding locations. Consequently the vertical locator unit 122 can be adjusted, via the adjustment mechanism 184, to alter the vertical placement of the side molding by altering the position of the wheel 172.

The adjustment mechanism 184 comprises an adjusting screw 190 carried on the body 106 by a threaded support 192. The screw 190 engages the bracket plate 186 to brace the plate against vertical movement relative to the body 106 and to enable bracket plate position adjustment when the adjusting screw is turned. The bracket plate is clamped to the body 106 by screws 193 (one illustrated in FIG. 6) threaded into the bracket plate and extending through elongated slots 194 (FIG. 4) in the bracket plate When the screws are loosened the adjusting screw can be turned to move the bracket plate vertically and thus adjust the height of the wheel 172. The screw is accessible to assembly line workers through an access port 195 in the body 106. A scale 196 is fastened to the body 106 and extends into the access port so that the extent of adjusting movement of the bracket plate can be determined by the operator.

The positioners 22, 24 cooperate in locating the body B but do not function in identically the same way. As the vehicle body approaches the system 10 it actuates a "vehicle in position" switch (not illustrated) disposed along the assembly line conveyor which causes the horizontal locator unit 120 to extend the bumper member 126 into its wheel well engaging position. The "vehicle in position" switch is located so that the locator 120 operates when leading edge of the wheel well has passed over the bumper member 126 thus avoiding the possibility of interference with the body B.

Engagement of the bumper member 126 by the wheel well moves the carriage 32 from its home position (as noted above) operating the home switch 152 so the positioner actuators 110, 110' drive the bodies 106, 106' towards engagement with the body B. The actuators operate independently from each other and each actuator stalls when its associated vehicle body engaging wheel engages the body B. The actuators 110, 110' then continue to bias the wheels 170, 170' against the vehicle body to locate the body relative to the carriage. As this positioner movement occurs, the bumper member 126 is shifted slightly along the wheel well edge to its final locating position on the body B.

Figure 3:
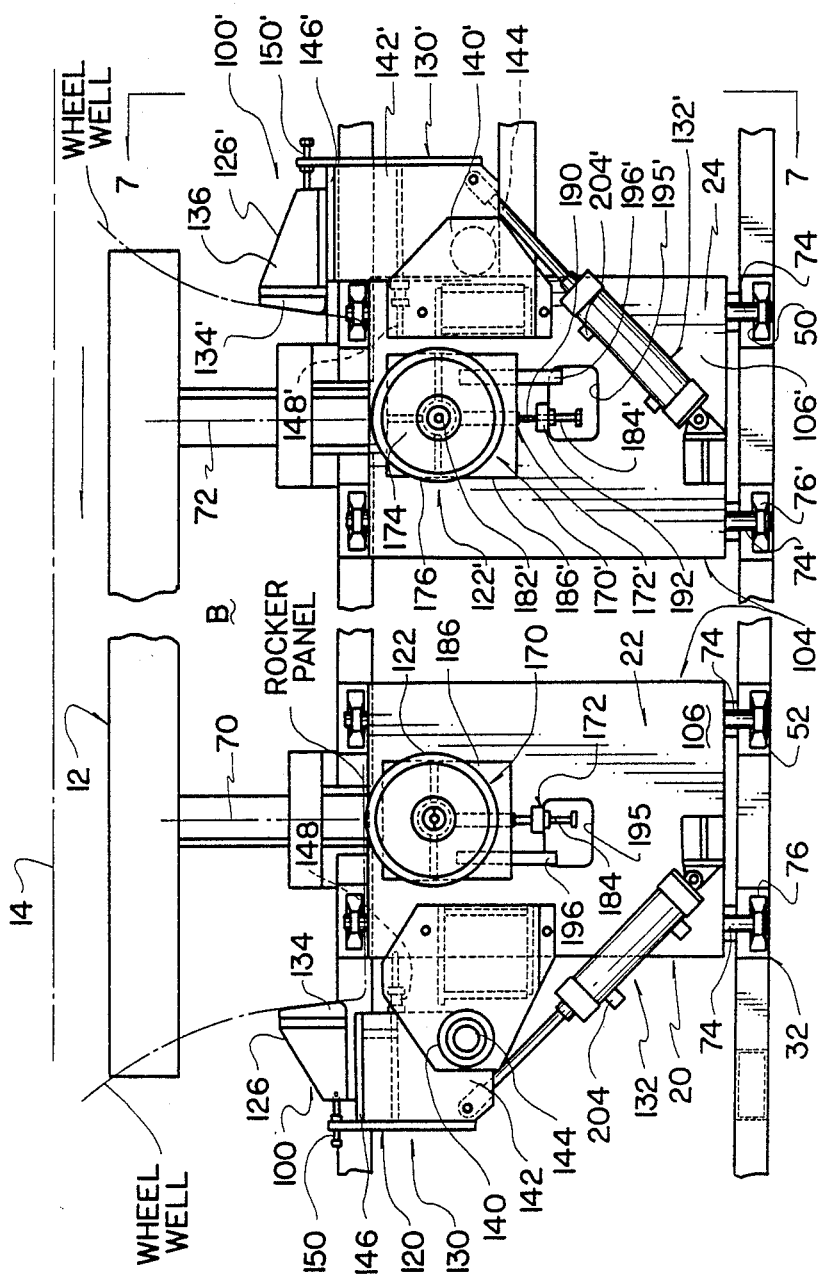
FIG. 3 is a fragmentary elevational view seen approximately from the plane indicated by the line 3—3 of FIG. 2 and shown on a scale which is larger than the scale of FIG. 2.

Operation of the home switch also initiates operation of the horizontal locator 120' of the positioner 24. The locator actuator 132' shifts the bumper member 126' into engagement with the vehicle body B. The bumper member is moved against the leading edge of the trailing wheel well (see FIG. 3) so that both bumper members 126, 126' engage the wheel well edges in opposition to each other as is illustrated by FIG. 3.

The actuator 132' is provided with operating pressure which is substantially greater than the regulated pressure supplied to the actuator 132. The actuator 132' thus exerts substantially more force on the body B than does the actuator 132. The actuator 132' is therefore driven to its limit position against the stop assembly 148' after which the actuator 132' stalls and maintains the bumper member 126' biased against the wheel well edge.

As the actuator 132' is driven to its limit position the force exerted by it on the body B overcomes the force of the actuator 132. As a result the actuator 132 is backed up and the bumper 126 is shifted by the body away from its limit position. This repositioning of the bumper members to their final locating positions results in the carriage 32 being shifted horizontally relative to the vehicle body B until the carriage is precisely aligned with the body.

The actuator 132' is associated with a conventional proximity switch 204 which senses when the actuator ram reaches the limit of actuator travel. The proximity switch 204 operates to initiate the side molding application operation of the system 10.

The Platen

Figure 6:
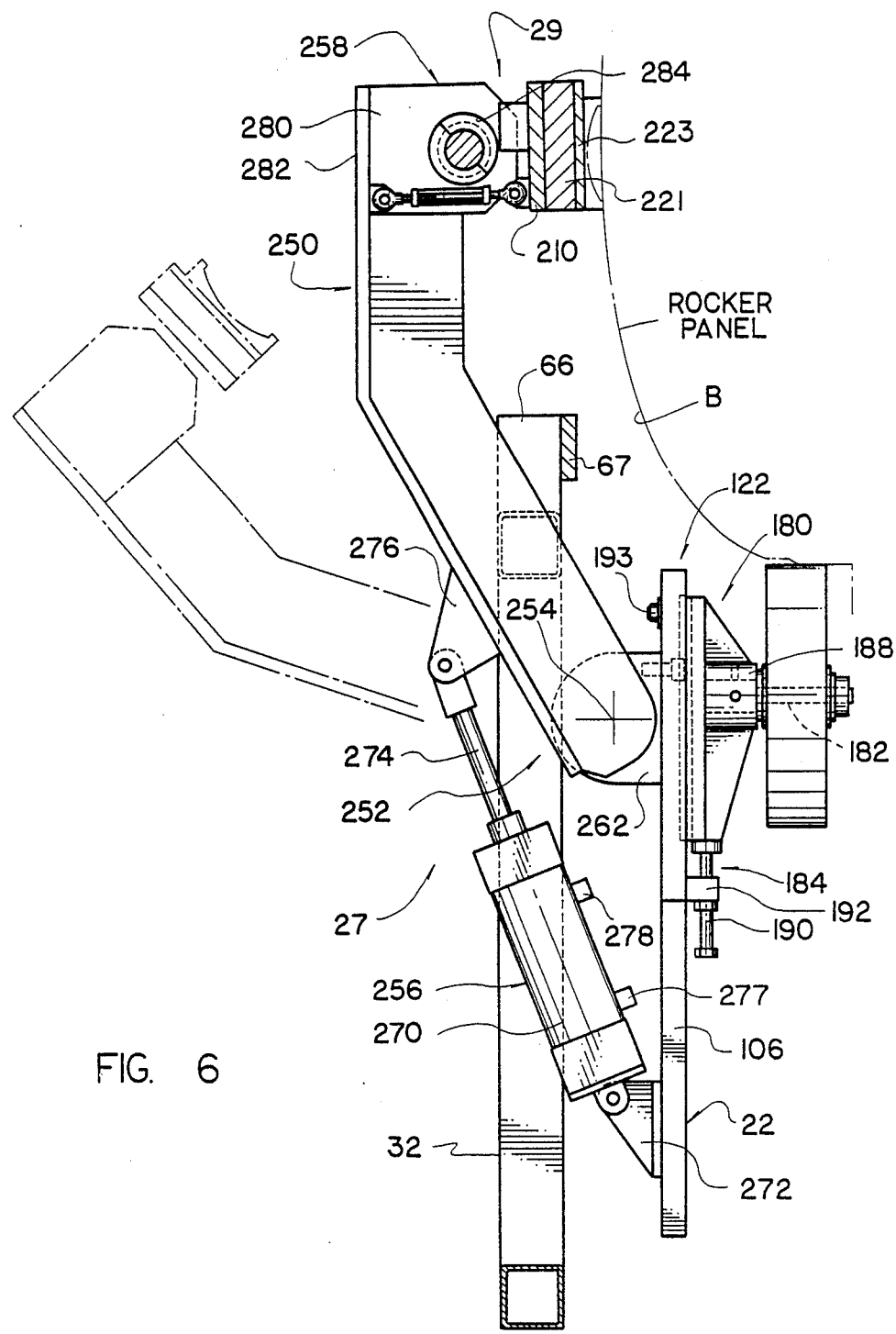
FIG. 6 is a fragmentary cross-sectional view seen approximately from the plane indicated by the line 6—6 of FIG. 1 and shown on a scale which is larger than the scale of FIG. 1.

Before the body B has been accurately aligned with the carriage 32 and the proximity switch 204 actuated, the platen 12 is loaded with appropriate side molding segments while in a "loading" position (broken lines in FIG. 6) and then actuated to a "ready" position where the platen is close to the eventual location of the molding receiving area of the body B (solid lines in FIG. 6). In its loading position the platen 12 presents its side molding receiving structure to the assembly line worker so that the side molding segments are easily and conveniently hand loaded onto the platen for application to the vehicle body. This is accomplished without necessitating removal of the platen from the positioners 22, 24. Typically at least three molding segments are applied to each side of the body B, one segment extending across each door and the remaining segments disposed on the body B between each wheel well and the adjacent door. The moldings are placed on the platen end to end in predetermined positions for application to the body B.

Body side moldings of the sort referred to are elongated and formed of a rubber-like material which may carry a decorative metallic trim. They are bonded onto the vehicle bodies by strong adhesives applied to the moldings during their fabrication and then covered by a tape-like protective element which is readily strippable from the adhesive. In the system 10 the protective tape is stripped off after the moldings are placed on the platen in its "loading" position thus exposing the adhesive. In the "ready" position the platen maintains the adhesive bearing molding faces in a substantially vertical plane. This molding orientation tends to minimize the airborne particulates falling on the adhesive as well as minimizing the time required for the moldings to be applied by the platen.

The platen 12 (see FIGS. 6, 8 and 9) is an assembly comprising a platen base plate 210, molding handlers 212 connected to the base plate for carrying the molding segments, and mounting blocks 214 for attaching the platen assembly to the platen actuator assemblies 27, 28 via the connecting structure 29.

The base plate 210 is an elongated rectangular steel or aluminum structural member which extends continuously throughout the length of the platen assembly. The base plate carries the handlers 212 which are, in the preferred embodiment, detachably secured to the base plate. The mounting blocks are connected to the base plate at opposite platen end portions 12a, 12b, respectively, by screws. The mounting blocks project from the base plate in the opposite direction from the handlers toward the connector structure 29.

The molding handlers 212 comprise molding support units 216 for receiving and supporting molding segments preparatory to the segments being applied to the body B and molding ejectors 218 for thrusting the molding segments onto the body B from the support units.

Figure 8:
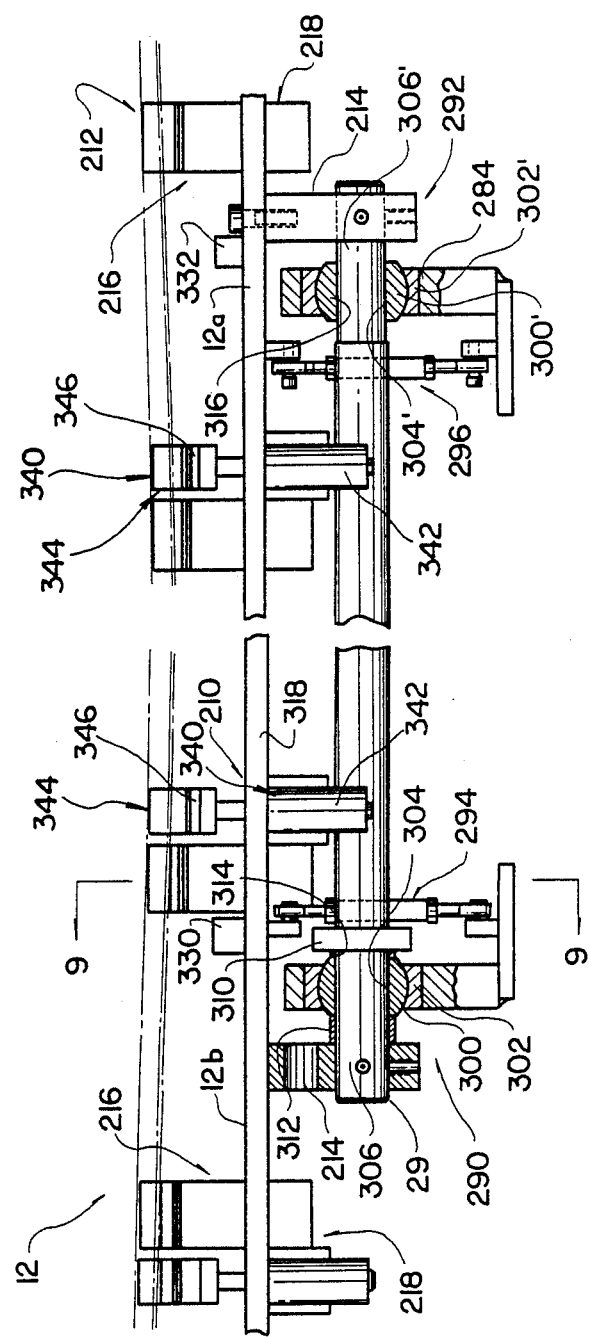
FIG. 8 is a top plan view of a platen forming part of the system of FIG. 1, having portions broken away and portions illustrated in cross-section and shown on a scale which is larger than the scale of FIG. 1; and, FIG. 9 is a fragmentary cross-sectional view seen approximately from the plane indicated by the line 9—9 of FIG. 8 and shown on a scale which is larger than the scale of FIG. 8.

The illustrated support units 216 are spaced apart along the base plate and constructed and arranged so that molding segments may be supported in gently curved configurations comporting generally with the vehicle body shape if that is desired (see FIG. 8). The units 216 each comprise a molding fixture 220 shaped to receive the molding and a spacer block 221 sandwiched between the fixture 220 and the base plate 210 for shimming the fixture to a desired position spaced from the base plate.

The fixture 220 is connected to the base plate by mounting screws 222 and comprises a backing plate 223 of aluminum, or equivalent material, and a molded plastic retainer 224 bonded to the backing plate 223 and shaped to conform to the molding cross-sectional configuration. The retainer 224 is a stiffly resilient material which can exert application forces on the molding segment without abrading it.

The spacer block 221 is dimensioned to support the fixture 220 the appropriate distance from the base plate to assure proper molding application to the body B. The spacer can be constructed of any suitable structurally strong material and is connected to the base plate by the screws 222. The block 221 can be removed and replaced by another block having a different thickness if it is desirable to change the configuration of the molding to accommodate different vehicle body designs, for example.

A molding ejector 218 is associated with each handler unit 216 for thrusting the molding segment into firm contact with the body B so the molding adhesive can obtain effective bonding contact with the body while assuring separation of the molding from the handler. The ejector comprises a molding actuator 226 attached to the base plate 210 and an armature 227 projecting from the actuator toward the molding location on the fixture. The actuator 226 is illustrated as a so called "pancake" actuator because of its flat shape and is a pneumatically powered ram and cylinder type actuator.

The armature 227 extends from the actuator 226 to a molding segment supported by the platen via a bore hole 228 through the base plate, the spacer and the fixture. The armature 227 comprises a metal rod 229 projecting from the actuator housing and a tubular plastic rod extension 230 fixed to the rod 229 and defining a molding engaging face confronting the molding segment.

The Platen Actuator Assemblies

The platen actuator assemblies 27, 28 are secured to the platen portions 12a, 12b, respectively, via the connector structure 29 to move the platen 12 between its loading position and its molding application position. The actuator assemblies 27, 28 operate individually but are constructed the same and therefore only the platen actuator assembly 27 is described in detail, primarily in reference to FIGS. 4 and 6. Parts of the actuator assembly 28 which are the same as parts described in reference to the assembly 27 are designated in the drawings by identical primed reference characters.

The actuator assembly 27 comprises a lever arm 250 pivotally movable to shift the platen end portion 12a, a pivot mount 252 fixed to the positioner body 106 for movably supporting the arm 250 about an axis 254, and an actuator 256 for actuating the lever arm.

The lever arm 250 is formed by a dog-leg shaped plate structure having a mounting shoe 258 at its end projecting away from the positioner body 106 and a trunnion 260 fixed at its opposite end and disposed in the pivot mount 252 on the axis 254.

The pivot mount 252 anchors the lever arm 250 in position for rotation about the axis 254 as it actuates the platen 12. The mount 252 comprises a pair of ball bearing pillow blocks 262 carrying the trunnion 260 on the axis 254. The trunnion 260 is received by the pillow blocks so the lever arm easily turns on the trunnion about the axis.

The actuator 256 shifts the lever arm between its loading position, where the platen is presented to the worker for loading a selected side molding segment on the fixture 220 (see the broken line view of the arm 250 in FIG. 6), and its molding application position where the molding is ejected onto the vehicle body (FIG. 6). The actuator is of the pneumatic ram and cylinder type comprising a cylinder 270 pivotally connected to the positioner body 106 by a clevice 272 and a ram 274 pivotally connected to the lever arm 250 by a clevice 276.

In the illustrated system 10 the actuator 256 is provided with proximity switches which enable control of the lever arm positioning at different times during operation of the system 10. A proximity switch 277, disposed on the cylinder 270 at the location of the ram piston when the platen is in its loading position, is operated by the ram piston to signal platen retraction. The platen remains in the loading position until the operator depresses a "start" button on a control panel (not illustrated) of the system 10. This causes the actuator 256 to drive the platen to the "ready" position just short of the molding application location. Another proximity switch 278 positioned on the cylinder 270 is operated by the actuator ram piston when the platen is at the ready position to stop further platen movement.

The mounting shoe 258 secures the platen actuator 256 to the connector structure 29. The shoe 258 comprises an ear-like mounting tang 280 welded to a lever arm stiffening flange 282. The tang 280 projects from the lever arm in the direction of the platen 12 and has a bearing supporting bore 284 extending through it along an axis parallel to the lever arm axis 254.

The Connector Structure

The connector structure 29 (see FIGS. 6,8 and 9) secures the platen 12 to the platen actuator assemblies 27, 28 for enabling limited relative rotational and translational motion between them so that the platen can comply with varying vehicle body orientations and configurations while precisely applying the moldings.

The connector structure 29 comes into play after the platen 12 has paused in its "ready" position and the vehicle body B has initially engaged the bumper member 126 and begun to move the carriage 32. At this juncture the positioners 22, 24 are operated, by their respective actuators 110, 110' to vertically locate the body B by engaging the underside of the rocker panel (see FIG. 6). The positioners 22, 24 operate independently so that if the vehicle rocker panel surface portions engaged by the positioner body assemblies 104, 104' are at different elevations, the bodies 104, 104' are likewise at different elevations. Consequently the platen 12 may be skewed with respect to the platen actuators when the platen is in its "ready" position. The connector structure 29 enables this skewing to occur freely without any binding of the platen and the platen actuators.

The connector 29 also enables the system 10 to function effectively when the vehicle body is misaligned about a vertical, or yaw, axis (i.e. the body is not headed exactly along the path 14.) When the vehicle body has been horizontally located with respect to the carriage 32 and the proximity switch 204 initiates the molding application step, the platen 12 is moved to press the molding onto the body B. The platen actuator assemblies 27, 28 operate independently. When, because of yawing, one actuator must move its associated platen portion 12a or 12b further than the other to engage the platen with the vehicle body B, the platen 12 is skewed slightly because of the angularity created between the platen and the platen actuators. The connector structure 29 enables this angularity to occur freely without any binding occurring between the platen and the platen actuators.

The illustrated connector structure 29 comprises spherical bearing assemblies 290, 292 between the platen actuators and the platen portions 12b, 12a, respectively, and adjustable stops 294, 296 associated with the respective bearing assemblies.

The bearing assembly 290 comprises a conventional spherical rod-end bearing assembly mounted in the tang bore 284. The bearing assembly comprises a bearing ball 300 and a ball race 302 fixed in the tang bore 284. The ball has a through bore 304 for receiving a shaft section 306 which extends into the platen mounting block 214 and is fixed there against movement relative to the platen. In the illustrated embodiment the shaft section 306 is keyed to the mounting block by roll pins which extend through aligned holes in the block and the shaft.

The bearing ball 300 is fixed against movement toward or away from the block 214 by a locking collar 310 fixed on the shaft section 306 and cylindrical shims 312, 314 disposed on opposite sides of the ball 300. The shims and bearing ball are snugly held between the block 214 and the collar 310 thus fixing the axial position of the ball on the shaft.

The spherical bearing assembly 292 is identical in most respects to the assembly 290 and therefore parts of the assembly 292 which are the same as parts of the assembly 290 are identified in the drawings by like, primed reference characters. The spherical bearing assembly 292 differs from the assembly 290 in that the bearing ball 300' contains an internal slide bushing 316 which slidably receives the shaft section 306' and thus permits relative translational motion between the platen and the carriage 32.

In the illustrated system 10 the shaft sections 306, 306' are formed on a common shaft, or tie rod, 318 extending substantially completely along the platen 12. While it is not essential that the spherical bearing assemblies 290, 292 be disposed on a common shaft, use of the shaft 318 has the advantage of providing some structural support to the platen base plate 210.

The relative motion permitted between the platen 12 and the platen actuators 27, 28 is quite limited in extent, but essential for effective operation of the system. Because the positioners 22, 24 are independently operated to move vertically and locate the body B, and since the platen actuators 27, 28 operate independently to press the moldings onto the body at differing locations depending upon the body orientation and the body shape, the dimension of the shaft 318 measured between the bearings 290, 292 is minimum when the bores 284, 284' lie on the same axis, and increases as the axes of the bores 284, 284' are moved apart.

In effect then, the shaft dimension between the bearings 290, 292 is foreshortened as the axes of the bores 284, 284' approach each other. The relative rotation afforded by the bearings permits the shaft to extend between and through the bores 284, 284' when their axes are out of alignment without bending forces being applied to the shaft. The relative translational movement between the shaft and the bore 284' enables the shaft dimension between the bores 284, 284' to change without tensile or compressive stresses being applied to the shaft 318.

It should be noted that the platen actuator trunnion axes 254, 254' are located vertically below the nominal location of the side molding application on the body B (see FIG. 6). This assures that the lever arms 250, 250' have moved the platen 12 to the top of its arc when the molding is being applied. Thus if the body B is shifted horizontally from where it should nominally be located, the molding elevation on the body will not be materially affected by over-travel or under-travel of one of the lever arms.

The spherical bearing assemblies 290, 292 by their natures, do not prevent relative rotation between the platen 12 and the actuator mounting tangs 280, 280' about the shaft 318. If such relative rotation occurred the platen 12 would "droop" relative to the tangs. The adjustable stops 294, 296 prevent this undesirable relative motion from occurring and also provide for fine adjustment of the angle between the moldings and the body B at the moment of contact between them to facilitate pressing the moldings in place. The preferred stops are identical and only the stop 294 is described in detail. Parts of the stop 296 which are the same as parts described in reference to the stop 294 are indicated by corresponding primed reference characters.

The stop 294 is formed by a turnbuckle 320 and oppositely projecting screw eyes 322, 324 connected to the lever arm 250' and the base plate 210, respectively, by pivot pins 326, 328 extending through the respective eyes. The turnbuckle 320 is formed with internal left and right hand threads receiving the screw eyes so that when the turnbuckle is turned the screw eyes are extended or retracted to shift the base plate 210 relative to the lever arm about the shaft 318.

Figure 9:
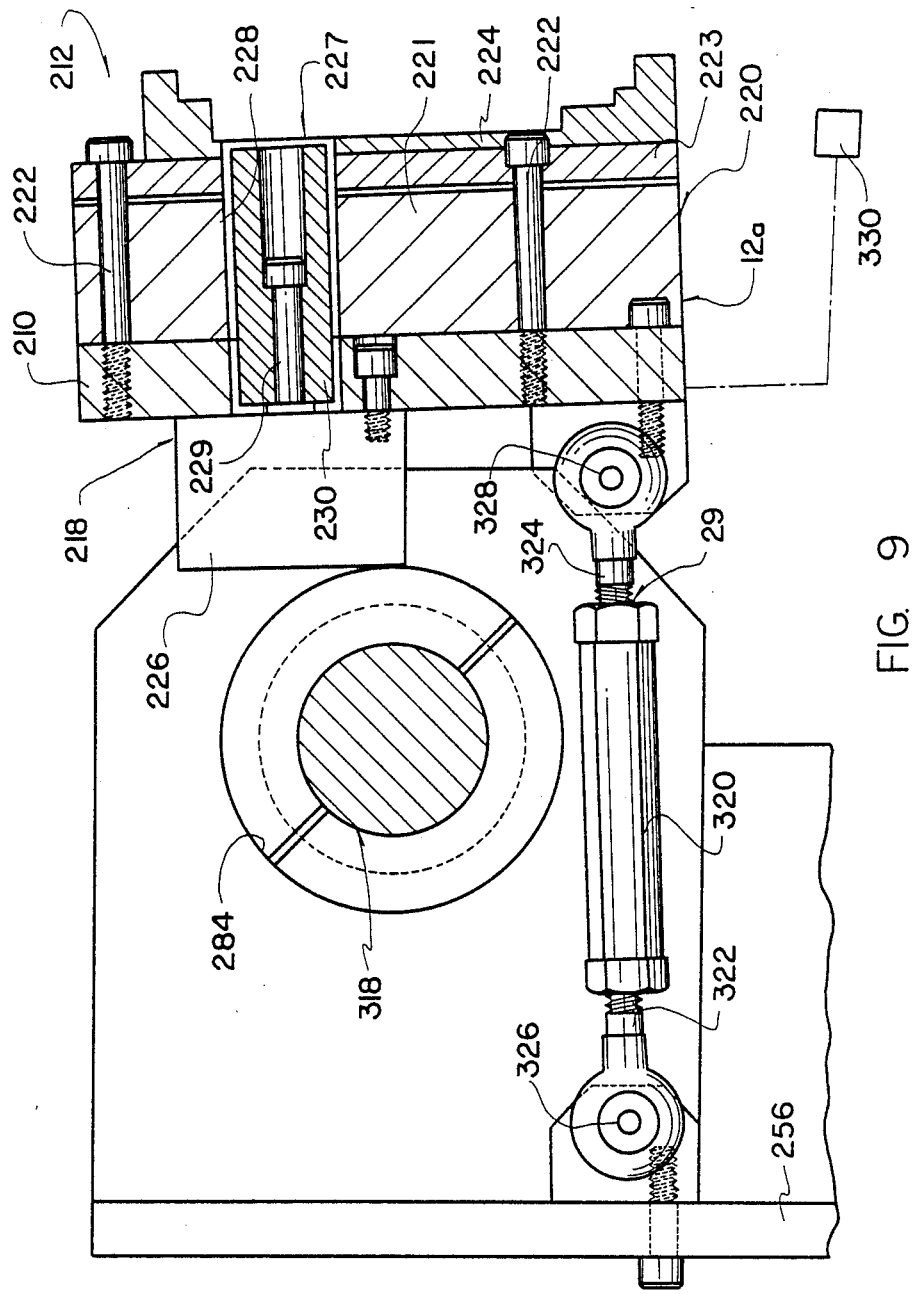

The turnbuckle is preferably adjusted so that the uppermost marginal edge of the moldings initially touches the body B as the platen 12 is advanced from the "ready" position. At this moment proximity switches 330, 332 carried by the platen at the platen portions 12b, 12a detect the body B and are actuated to initiate operation of the molding ejectors 218. The proximity switches are schematically illustrated in FIGS. 8 and 9. The moldings are thrust against the body B with the adhesive covered surface moving into contact with the body progressively proceeding from the uppermost molding edge. This assures good contact between the body and the adhesive and minimizes the possibility of air entrapment along their juncture.

After a brief time delay period, during which the moldings remain pressed against the body B, the platen actuator assemblies return the platen to its "loading" position. As the platen actuators pass through the "ready" position the proximity switches 278, 278' are actuated and cause the horizontal positioner bumper members 126, 126' to be retracted from the body, and the positioners 22, 24 to return to their initial positions away from the body.

When the body has been cleared by the various locator mechanisms the carriage drive unit 54 drives the carriage back to its "home" position where the "home" switch 152 is actuated to stop the carriage. The system 10 is thus in condition to begin the next side molding application cycle. In the preferred system 10 the positioner actuators, horizontal locator actuators and the platen actuators are all provided with proximity switches which change state when the actuator has withdrawn its associated element from the vehicle. The status of these switches is checked to verify the actuator positions before the drive unit 54 is operated to return the carriage to its home location.

Vehicles having identical bodies but different trim styles, are produced on the same assembly line. In such cases various different side molding configurations are employed. An alternative side molding configuration can be employed in the illustrated system 10 by the use of supplemental molding support units 340. The supplemental support units 340 are illustrated in FIG. 8 of the drawings.

Each unit 340 is formed by a pneumatic ram and cylinder actuator 342 mounted on the base plate 210 adjacent a molding handler 212. The ram extends toward the molding location and carries a molding fixture 344 and a spacer 346 at its projecting end. The fixture and spacer are of essentially the same construction as those referred to in connection with the handlers 212 except the molding retainer is formed to accommodate a side molding segment having a smaller cross-sectional area and extent than that retained by the retainer 224. When the "smaller" side molding segments are to be applied to a vehicle body by the system 10 the actuators 342 are operated to advance the associated molding retainers 344 into registration with the handlers 212. The smaller moldings are then loaded onto the retainers 344 where they are supported as well, by the handlers 212 and aligned with the molding ejectors for application to the body.

While only a single preferred embodiment of the invention has been illustrated and described in considerable detail the present invention is not to be considered limited to the precise construction shown. Various adaptations, modifications and uses of the invention are apt to occur to those skilled in the art to which the invention relates.

For example, although the application of side moldings is disclosed, different operations could be performed if desired (such as applying pin striping, performing machining operations, etc.). In such circumstances the platen 12 or an equivalent structure would form a fixture or a tool holder for enabling the appropriate manufacturing operations to be performed.

The platen 12 could also be modified to apply two or more different molding types by providing two or more different molding retainers, each indexed into an application position by suitable actuators mounted on the platen.

The intention is to cover hereby all such adaptations, modifications and uses which fall within the spirit or scope of the appended claims.

Having described my invention I claim:

1. A positioning system for automatically positioning first and second spaced apart portions of a fixture or tool holding platen in precise positions with respect to widely spaced locations on assembly line products wherein successive products have slightly differing pitch, yaw and roll orientations with respect to the positioning system, the positioning system comprising:
    (a) a support unit;
    (b) first and second positioner means supported by said unit for engagement with respective first and second product locations to position said first and second platen portions with respect to the first and second product locations, each of said positioner means comprising;
        (i) a product locator structure for engaging a respective one of said first and second product locations and locating said product location with respect to said positioner means; and,
        (ii) platen actuator means carried by said positioner means for moving a respective one of said platen portions to an operating position precisely positioned with respect to a respective one of said product locations;
    (c) connecting means for securing said platen actuator means to respective ones of said first and second platen portions for limited relative motion to enable said positioning system to accommodate pitch, roll and yaw variations in product orientation.

2. The positioning system claimed in claim 1 wherein the products continuously move along an assembly line path of travel and said support unit comprises a base and a carriage supported upon said base for movement along said path of travel, said positioner means supported on said carriage for movement toward and away from locating engagement with one of said products.

3. The positioning system claimed in claim 1 further including biasing means for biasing at least one of said positioner means toward engagement with one of said products to locate the same.

4. The positioning system claimed in claim 3, further including second biasing means for biasing the other of said positioner means toward engagement with one of said products to locate the same, said first and second biasing means operating independently.

5. The positioning system claimed in claim 3 wherein the products move along an assembly line path of travel and said support structure further includes a carriage movable along said path of travel, said positioner means supported on said carriage with said at least one positioner means supported for movement toward and away from locating engagement with one of said products.

6. The positioning system claimed in claim 5 wherein said means comprises an actuator for shifting each of said respective positioner means relative to said carriage, said actuators actuating said positioner means along paths of travel which are fixed with respect to each other.

7. The positioning system claimed in claim 3 wherein said biasing means comprises an actuator for shifting said positioner means relative to one of said products.

8. The positioning system claimed in claim 1 wherein said product locator structures each comprises a horizontal locator means, said locator means engaging product at predetermined locations thereon and exerting forces upon one of said products and the support structure for shifting the support structure with respect to the product to align the same.

9. The positioning system claimed in claim 1 wherein said connecting means comprises bearing means between said platen actuators and said platen portions for enabling the angularity between said platen and said platen actuator means to change in the event one of said platen portions travels further toward one of said products than the other.

10. The positioning system claimed in claim 9 wherein said connecting means further includes structure for enabling relative translational motion between said platen and said platen actuator means in the event the angularity between said platen and said platen actuator means changes.

11. A positioning system for automatically positioning first and second widely spaced portions of a work or tool holding platen in a precise position with respect to first and second widely spaced locations of products in a continuously moving assembly line wherein successive products have slightly differing pitch, yaw and roll orientations with respect to the positioning system, the positioning system comprising (a) a support base;
(b) a carriage assembly supported by said base for translational movement relative to said base along a carriage path of travel;
(c) first and second positioner means supported by said carriage for motion relative to said first and second product locations along a first and second positioner paths of travel transverse to said carriage path of travel and fixed with respect to said carriage;
(d) said positioner means comprising respective product locator structures for engaging one of said products and locating said respective product locations with respect to said positioner means, and respective actuator means for moving the first and second platen portions to locations precisely positioned with respect to the respective product locations; and,
(e) connecting means for securing said actuator means to said first and second platen portions for limited relative rotational and translational motion.

12. The positioning system claimed in claim 11 wherein said base comprises track structure engaging and movably supporting said carriage, said track structure constraining motion of the carriage to a predetermined path parallel to the product motion.

13. The positioning system claimed in claim 11 wherein said connecting means comprises first bearing structure enabling relative rotation between said platen portions and their respective associated actuator means about at least two axes and second bearing structure enabling relative translational motion between at least one portion and the associated actuator means.

14. The positioning system claimed in claim 11 wherein said first positioner means comprises a body member slidably supported on said carriage and said product locator structure includes a product engaging element supported for movement with respect to the body member and a locator actuator reacting between the body member and the product engaging element for shifting said element to and away from a product engaging position.

15. The positioning system claimed in claim 14 wherein said product locator structure further comprises a second product associated engaging element supported by the body member for engaging the product when said first positioner means moves toward said product location along said path of travel.

16. The positioning system claimed in claim 1 wherein each of said positioner means further comprises positioner actuator means acting between said positioner means and said support unit for shifting said positioner means relative to one of said products.

* * * * *